United States Patent Office 3,051,957
Patented Sept. 4, 1962

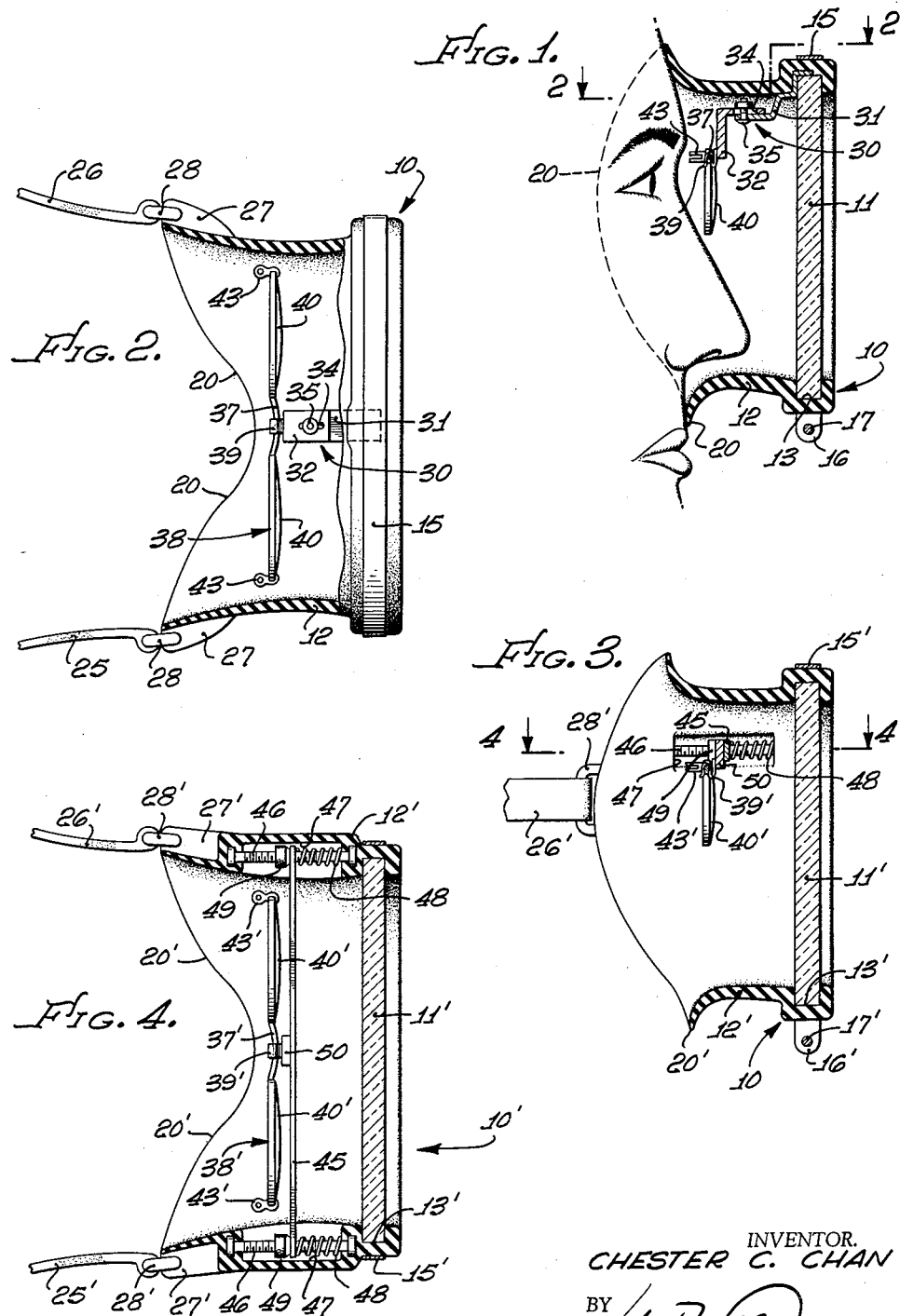

3,051,957
FACE MASK FOR DIVING
Chester C. Chan, Los Angeles, Calif.
(15926 Maracaibo Place, Hacienda Heights, Calif.)
Filed Mar. 16, 1959, Ser. No. 799,533
5 Claims. (Cl. 2—14)

This invention relates to diving masks of the type used by skin divers and more particularly to an improved mask of this type having provision for supporting temporarily the prescription eyeglasses of the diver inside the mask in order that the diver may have the benefit of the glasses while wearing the mask.

The sport of skin diving has become very popular in recent years, and particularly so since the perfection of breathing devices and simplified face masks removing the hazards heretofore restricting the enjoyment of this sport. Diving mask facilities heretofore provided, while highly satisfactory for many divers, are quite unsatisfactory for others in need of corrective viewing lenses. Various proposals have been made for overcoming the obstacles confronting such divers in need of optical assistance for distance viewing, but these leave much to be desired. For example, proposals have been made utilizing special face plates fitted with prescription ground lenses in the sight path of each eye. Such masks of this type as have been proposed are expensive and suitable for use only by the person for whom the lenses were ground. There has also been proposed a diving mask having areas of the face plate opposite the eyes prescription ground to the individual diver's particular requirements. This mask too is expensive and suitable for use only by the person for whom made.

The foregoing and other shortcomings of diving masks heretofore provided are avoided by the present invention utilizing simple and inexpensive expedients readily adaptable to presently available diving masks and having provision for utilizing the diver's own prescription eyeglasses, both within and out of the water. Moreover, by virtue of specially designed supporting means for the lenses, it is immaterial whether the wearer uses the rather uncommon pince-nez style of eyeglass or the more commonly worn type having side bows engaging over the ears. In the case of the pince-nez type, no adjustment or change in the eyeglass is required. If the diving mask is of the common type having a shroud supporting the face plate along a line of contact about the eyes, as many present-day diving masks do, it is a simple matter to remove the side bows and then mount the lenses proper in a fast-action clamping device carried interiorly of the face mask, the side bows being remounted on the frames after diving. Meanwhile, the mask may be used by another diver. Should the second diver have need for glasses, he simply mounts his spectacles in the support therefor and adjusts this support as may be necessary for most effective vision when he is wearing the mask. If the second diver has no need for visual aid, he wears the mask in the usual manner and with the same efficiency and effectiveness as though it did not incorporate means for supporting spectacles therewithin.

Accordingly, it is a primary object of the present invention to provide an improved diving mask for use by divers and incorporating means therein for temporarily supporting the diver's own eyeglasses.

Another object of the invention is the provision of a simple adjustable support for eyeglasses adapted to be mounted in any conventional diver's mask without alteration in the mask proper and by means of which the diver's own eyeglasses may be worn along with the mask both above and below water.

Another object of the invention is the provision of a diver's mask incorporating in the interior thereof resilient means for detachably supporting the diver's own prescription ground eyeglasses with the lenses thereof supported in his line of vision and substantially free of contact with the diver's person.

These and other more specific objects will appear upon reading the following specification and claims and upon considering in connection therewith the attached drawing to which they relate.

Referring now to the drawing in which preferred embodiments of the invention are illustrated:

FIGURE 1 is a vertical sectional view through one preferred embodiment of the invention showing the diving mask in position on the diver's face;

FIGURE 2 is a fragmentary sectional view on a somewhat smaller scale taken along broken line 2—2 on FIGURE 1;

FIGURE 3 is a view similar to FIGURE 1 of a second preferred embodiment of a diving mask showing a pair of spectacles secured in wearing position therein; and FIGURE 4 is a transverse sectional view taken along line 4—4 on FIGURE 3.

Referring more particularly to FIGURES 1 and 2, there is shown a diver's mask designated generally 10 incorporating therein a spectacle supporting bracket or adapter suitably formed for attachment and support in any conventional diving mask. The mask illustrated typically includes generally elliptically shaped transparent face plate 11 of glass or plastic. A resilient rubber shroud 12 of generally tubular shape includes a deep groove 13 at one end fitting snugly over and adapted to be tightly clamped to the rim of face plate 11. For this purpose there is provided a split metal band 15 having out-turned tangs 16 at its split ends seating, in openings carried thereby, a thumbscrew 17 by which band 15 can be constricted to clamp the bottom of groove 13 tightly against the edge of face plate 11. The rear or face contacting end of shroud 12 has thin contoured rim edges 20, contoured for snug water-tight contact with the juxtaposed portions of the diver's face and forehead in a manner well known to those skilled in this art.

Any suitable means may be provided for securing the mask in position about the eyes and nose of the diver. For example, one commonly used expedient includes a pair of straps 25, 26 coupled to heavy bosses 27 at the opposite lateral sides of shroud 12 as by metal links 28. The outer free ends of straps 25, 26 are provided with suitable buckle or retainer means by which tension may be applied to the straps and to shroud 12 to hold the mask in position on the diver.

The spectacle supporting device, which may be manufactured and sold separately from the mask and secured in place thereon by the owner of the mask, is designated generally 30 and includes a pair of L-shaped brackets 31, 32. One end of bracket 31 is suitably formed to fit about the upper rim edge of front plate 11 as in the manner best illustrated in FIGURE 1 and to be held rigidly in place by clamping band 15. As will be apparent from FIGURE 1, band 15 not only anchors bracket 31 in a predetermined position, but seals the resilient material of shroud 12 about this bracket and the adjacent areas of face plate 11.

The overlapping intermediate ends of brackets 31, 32 include a slot or lost-motion connection 34 through which the thumbscrew 35 is inserted to secure brackets 31, 32 in a desired adjusted position. Fixed to the lower end of the vertical leg of bracket 32 is any suitable means 39 engageable over nosepiece 37 of a pair of spectacles 38 and by which the spectacle frame may be securely but detachably clutched interiorly of the diving mask. As here shown, spectacle clutching device 39 comprises a resilient spring clip formed to straddle nosepiece 37 and to grip the same firmly to support the spectacle with lenses 40, 40 properly aligned with the axes of the diver's eyes. As illustrated in FIGURE 1, lenses 40 are positioned somewhat forwardly of the usual wearing position with respect to the eyes. This position may be preferred when wearing the mask in the interest of good vision and particularly in order to avoid the possibility of the spectacles contacting the person, as such contact is disquieting when wearing the mask under water. Other divers prefer that the lenses be located closer to the eyes. These various preferences are easily accommodated simply by adjusting thumbnut 35 to position the glasses to suit the individual diver.

Should the diver's spectacles utilize bows attached to the opposite ends of the frame, it is necessary that these bows be detached while wearing the glasses within the mask. Various modes of attaching side bows to spectacle frames are employed, but all have provision for detaching the bows. In the spectacles illustrated in FIGURE 1, such means includes a pivot clip or clevis 43 fixed to the frames and having a threaded opening for receiving a pivot pin passing through the pivoting socket on each bow.

Assuming that the diver owns a mask of the general type shown in FIGURE 1, he may convert it for use to support his own spectacles simply by purchasing adapter 30 and securing the same to the top edge of the face plate in the manner made clear by the foregoing description. The only other operation required before mounting the mask on his head is to clip the nosepiece of his spectacles within clip 39 of adapter 30 and making any adjustment in thumbnut 35 required to align the lenses in the most comfortable wearing and viewing position. The mask is then secured over the face and worn in the usual manner. After the diving operation has been concluded, the spectacles are withdrawn from snap clip 39 and worn as is customary. Another diver may use the mask immediately with or without his own spectacles as he elects.

Referring now to FIGURES 3 and 4, there is shown a second preferred embodiment of the invention, the same or similar parts being designated by the same reference characters distinguished by the addition of a prime. This form differs from the first described embodiment primarily in that spectacle supporting member 45 has its ends slidably supported along a pair of threaded rods 46, 46 embedded at their ends in the material of resilient shroud 12'. Rods 46 are generally parallel to one another and normal to face plate 11'. Each rod extends lengthwise within elongated recesses 47 formed in the shroud. Light coil springs 48 encircle rods 46 with one end bearing against the forward side of spectacle mounting strip 45 and the other end bearing against the adjacent end of recess 47. Thumbnuts 49 mounted on rods 46 bear against the opposite side of strip 45 and serve in cooperation with springs 48 to adjust the strip toward and away from the wearer's eyes. Secured to the lower end of a tab 50 fixed to the midportion of strip 45 is a spring strip 39' engageable over the nosepiece of spectacle frames 38'.

It is pointed out that the second embodiment operates substantially in the same manner and for the same purposes pointed out in detail in connection with the first described embodiment. Thus, to attach the spectacles in operating position, it is merely necessary to snap the nosepiece 37' of pince-nez type glasses within clip 39'.

Any necessary adjustment of the spectacle lenses relative to the eyes may be made by adjusting nuts 49 along supporting rods 46 for strip 45. In case the diver wears bow-supported spectacles, it is necessary to remove these bows before mounting the spectacle frames within clip 39'.

While the particular diving mask herein shown and disclosed in detail is fully capable of attaining the objects and providing the advantages of hereinbefore stated, it is to be understood that it is merely illustrative of the presently preferred embodiments of the invention and that no limitations are intended to the details of construction or design herein shown other than as defined in the appended claims.

I claim:

1. In a face mask adapted to be worn over the face in fluid-tight relation therewith and of the type having a transparent front plate positioned before the wearer's eyes and supported in spaced fluid-tight relation forwardly thereof by a resilient tubular body, adapted to be held pressed against the head and face of the wearer in covering relation to the eyes and nose, that improvement which comprises means for adjustably, detachably and temporarily supporting the wearer's regular eyeglasses without templepieces and the common frame for each eyepiece thereof from the interior of said mask and in the wearer's line of vision.

2. A face mask as defined in claim 1 characterized in that said eyeglass supporting means includes a bracket held anchored over and sealed to the upper edge of said transparent face plate at the junction of said resilient tubular mask body with said face plate.

3. A face mask as defined in claim 1 characterized in that said eyeglass supporting means is resilient thereby permitting momentary contact of the eyeglasses with the face of the wearer without danger of injury to the glasses or to the wearer and yet effective in holding the glasses normally in a predetermined line of sight aligned with the vision axis of the wearer.

4. A face mask as defined in claim 3 characterized in that said resilient supporting means is mounted in the body of said mask laterally to either side of the wearer's eyes and near the top edge of said face plate.

5. A face mask having a transparent face plate supported about the edges thereof in a resilient pliant shroud adapted to fit over the wearer's eyes in fluid-tight relation, a pair of elongated rigid support members generally parallel to one another and having their opposite ends supported along the interior lateral sides of said shroud and generally normal to the plane of said face plate, a member having its opposite ends movably supported by said support members, resilient means adjustably connecting said member to said support members, and means for temporarily mounting the wearer's own prescription eyeglasses on said member with the eyeglass lenses positioned in the wearer's line of vision when said mask is properly secured in place over the wearer's face.

References Cited in the file of this patent

UNITED STATES PATENTS

| | | |
|---|---|---|
| 1,435,533 | Knackstedt | Nov. 14, 1922 |
| 2,386,998 | Young | Oct. 16, 1945 |
| 2,388,713 | Schutz | Nov. 13, 1945 |
| 2,737,659 | Glidden | Mar. 13, 1956 |
| 2,905,172 | Rodenhouse | Sept. 22, 1959 |